US010399599B2

(12) United States Patent
Zegelaar et al.

(10) Patent No.: US 10,399,599 B2
(45) Date of Patent: Sep. 3, 2019

(54) DRIVER ASSISTANCE SYSTEM

(71) Applicant: Ford Global Technologies, LLC, Dearborn, MI (US)

(72) Inventors: Peter W. A. Zegelaar, Heerlen (NL); Helmuth Bosch, Leverkusen (DE); Michael Schiebahn, Bornheim (DE); Yvette Keidies, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 93 days.

(21) Appl. No.: 15/291,535

(22) Filed: Oct. 12, 2016

(65) Prior Publication Data

US 2017/0101131 A1    Apr. 13, 2017

(30) Foreign Application Priority Data

Oct. 13, 2015    (DE) .......................... 10 2015 219 804

(51) Int. Cl.
| | |
|---|---|
| *B62D 15/02* | (2006.01) |
| *B62D 5/04* | (2006.01) |
| *B62D 6/10* | (2006.01) |
| *G08G 1/16* | (2006.01) |

(52) U.S. Cl.
CPC ......... *B62D 15/025* (2013.01); *B62D 5/0463* (2013.01); *B62D 6/10* (2013.01); *B62D 15/0265* (2013.01); *G08G 1/16* (2013.01); *G08G 1/165* (2013.01); *G08G 1/166* (2013.01)

(58) Field of Classification Search
CPC .............. B62D 15/025; B62D 15/0265; B62D 5/0463; B62D 6/10; G08G 1/16; G08G 1/165; G08G 1/166
See application file for complete search history.

(56) References Cited

U.S. PATENT DOCUMENTS

| | | | | |
|---|---|---|---|---|
| 5,762,160 | A * | 6/1998 | Shimizu ............... | B62D 5/0463 180/169 |
| 7,496,436 | B2 * | 2/2009 | Galkowski ............ | B62D 6/003 701/41 |
| 2007/0203617 | A1 * | 8/2007 | Haug .................. | B60W 10/184 701/1 |
| 2012/0055731 | A1 * | 3/2012 | Lee ...................... | B62D 5/0463 180/446 |
| 2015/0112570 | A1 * | 4/2015 | Schmudderich ...... | B60W 50/14 701/93 |
| 2015/0290788 | A1 * | 10/2015 | Johansson ................ | B25D 9/26 173/1 |
| 2015/0302751 | A1 | 10/2015 | Strauss et al. | |

FOREIGN PATENT DOCUMENTS

| | | | | |
|---|---|---|---|---|
| DE | 10354662 | A1 | 6/2005 | |
| DE | 102014211452 | A1 | 2/2015 | |
| EP | 1927499 | B1 * | 1/2010 | ............ B60W 30/09 |

* cited by examiner

*Primary Examiner* — Rachid Bendidi
(74) *Attorney, Agent, or Firm* — Raymond L. Coppiellie; Burgess Law Office, PLLC

(57) ABSTRACT

A driver assistance system for a motor vehicle configured to recognize an exceptional situation by querying at least one sensor and if necessary applying a corrective or applied steering torque to a steering wheel. The driver assistance system configured to differentiate between a lower reliability and a higher reliability and upon the recognition to set the steering torque depending on the reliability.

14 Claims, 3 Drawing Sheets

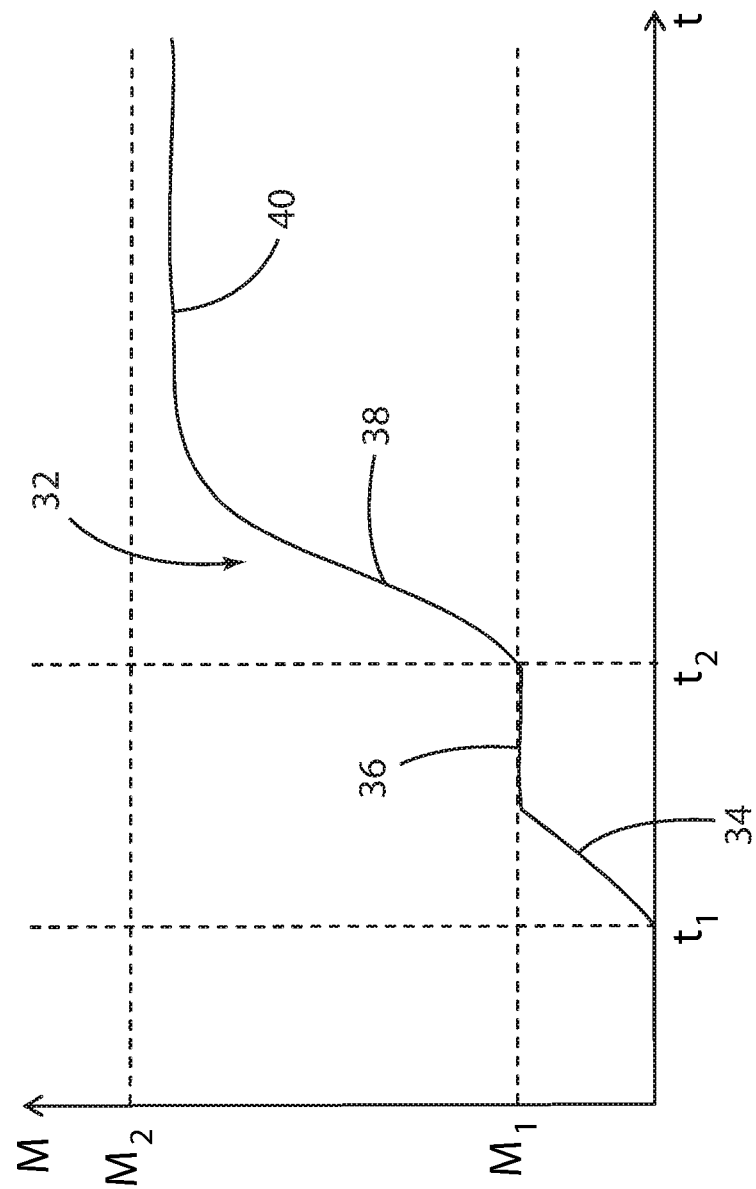

DRIVER ASSISTANCE SYSTEM

CROSS-REFERENCE TO RELATED APPLICATIONS

Not Applicable.

BACKGROUND OF THE INVENTION

1. Field of the Invention

The invention relates to a driver assistance system and, more specifically, to a system applying a torque based on a reliability determination.

2. Description of Related Art

Numerous concepts in the field of driver assistance systems help a driver of a motor vehicle; in particular, such systems may assist the driver in potentially hazardous situations. Such systems may directly engage specific functions of the vehicle or may give the driver a suggestion regarding vehicle control. Known examples of such driver assistance systems are ESP (electronic stability program) and ABS (anti-lock braking systems). These systems normally monitor, using suitable sensors, the present state of the vehicle, for example, wheel speeds, yaw rate, velocity and acceleration, etc. Other systems, for example, parking assist or brake assist, also monitor the surroundings of the vehicle using cameras, ultrasound sensors, radar sensors, lidar sensors, or the like.

In important situations, some assistance systems help vehicle steering. In such a situation, the system may superimpose, in addition to the normal steering assistance by a steering torque produced by a power steering control unit corresponding to the steering movement of the driver, a corrective steering torque to either strengthen or weaken the steering movement given by the driver. In addition the system a may suggest an adaptation of the steering angle to the driver using a detectable force in the steering wheel.

Imposing more torque into the steering is desirable only on recognizing a potentially hazardous situation with sufficient reliability. Otherwise, incorrect recognitions lead to driving behavior of the vehicle that is unpleasant and/or unacceptable to the driver. Improved sensors or an improved analysis of the sensor signals may cut this problem. In addition, analyzing input signals from two independent sensors may help recognize the hazardous situation, so that an increased level of security results due to the redundancy.

In addition, the corrective steering torque and the rate of change over time thereof are limited, to prevent the driver from feeling a sudden, strong steering torque in the steering wheel with an incorrect recognition, which could irritate the driver or cause the steering wheel to slips away from the driver. Using a more or less "soft" increase of the steering torque, well controllable by the driver, lets the driver override any increase of steering torque. Sometimes where fractions of a second could be decisive, the full steering torque is not available promptly, because the system reacts sluggishly.

SUMMARY OF THE INVENTION

A driver assistance system for a vehicle having a power steering unit for applying steering torque and a sensor for obtaining data. The system also includes a control unit receiving said data from the sensor and based on the data recognizing an exceptional situation. Upon recognizing the exceptional situation, the control unit differentiates between a lower reliability and a higher reliability of the exceptional situation and applies a steering torque based on the reliability.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a graph diagram showing a time curve of a corrective steering torque generated by the driver assistance system from FIG. 1.

DETAILED DESCRIPTION OF THE PREFERRED EMBODIMENTS

The following description of the preferred embodiment(s) is merely exemplary in nature and is in no way intended to limit the invention, its application, or uses.

Figure 1:
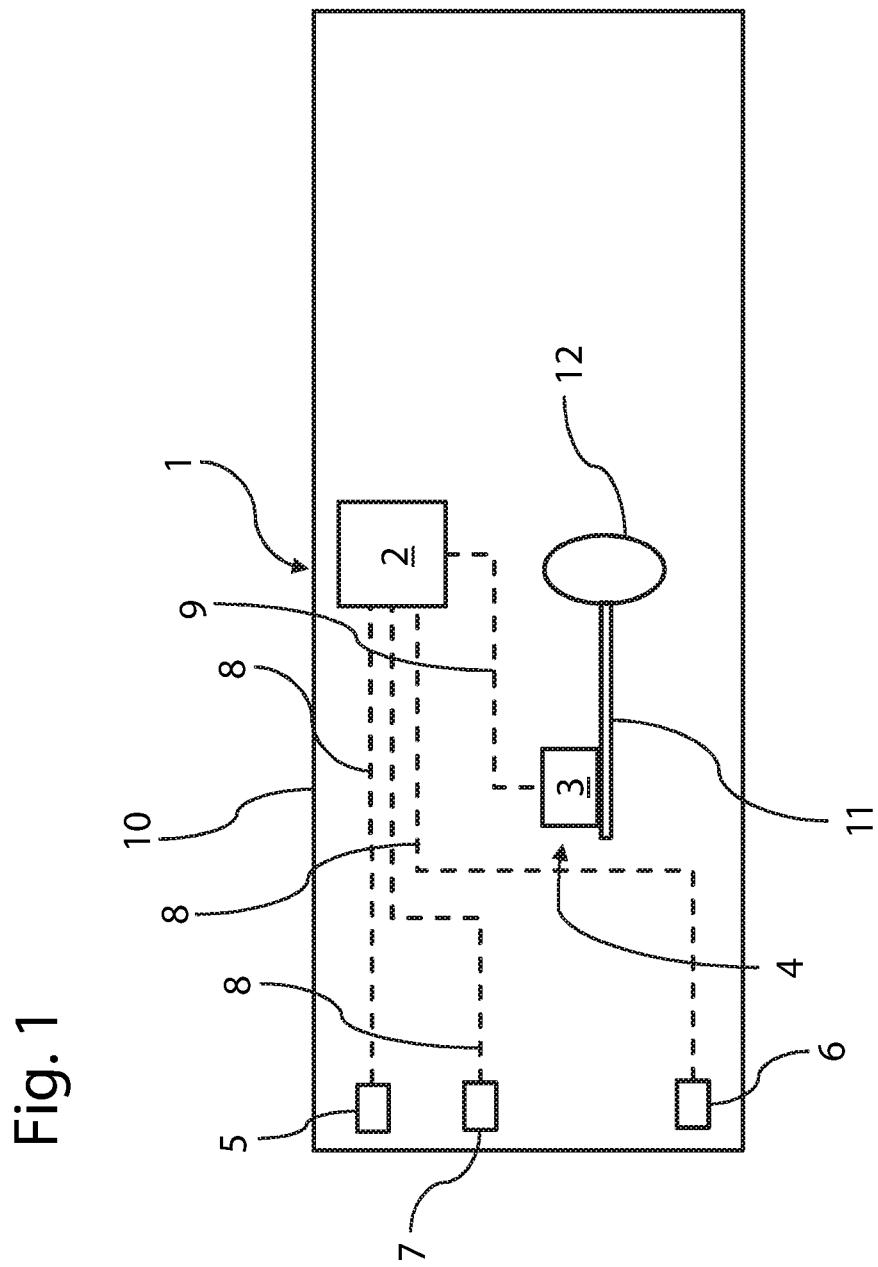
FIG. 1 is schematic illustration of a motor vehicle having a driver assistance system according to the invention.

FIG. 1 is a schematic illustration of a driver assistance system 1 according to one example of the present invention in a motor vehicle 10. The driver assistance system 1 includes a control unit 2 that transmits control signals, through a control line 9, to a motor 3 of an electromechanical power steering unit 4. The electromechanical power steering unit 4 acts on a steering rod 11 connected to a steering wheel 12. The system 1 has multiple sensors for obtaining data related to the vehicle and its surroundings, including for example a first camera 5, a second camera 6, and a radar sensor 7. The control unit 2 receives sensor data through data lines 8 from each sensor 5-7, including image data from the cameras 5, 6 and data relating to the reception of reflected radar signals from the radar sensor 7.

While shown as separate lines, the data lines 8 and the control line, the signal transmission system could also be a bus system connected to the control unit 2, the motor 3, and/or the sensors 5-7. Rather than hardwired, the system may also use wireless transmission. The part positions as shown are only schematic and can deviate from the actual installation position.

In normal operation of the vehicle, the electromagnetic power steering unit 4 produces a steering torque corresponding to the steering movement input by the driver; i.e., the torque simply helps the steering movement of the driver. Upon receiving data from the sensors 5-7 indicating the existence of an exceptional situation, one example of an exceptional situation is a possible collision with a stationary object (not shown), the control unit 2 transmits control signals to the motor 3 whereby the motor produces a corrective steering torque M which acts through the steering rod 11 on the steering wheel 12. The steering torque indicates to the driver the need to perform a correction of the steering wheel angle. The correction dependent on an ascertained target driving line for the vehicle ascertained by the control unit 2 or by an external unit supplying corresponding data to the control unit 2. Ascertaining the optimum driving line and the required corrections of the steering wheel angle, requires, besides the data of the sensors 5-7, additional information, for example, the present steering wheel angle, the velocity of the vehicle, a possibly provided yaw rate, etc. Additional sensors (not shown) may be required for this purpose.

The driver assistance system 1 may be used, with a passenger automobile or truck. The driver assistance system 1 configured to recognize an exceptional situation by obtaining data from at least one sensor 5-7 and thereupon applying an applied or corrective steering torque to a steering wheel 12 in the event of an exceptional situation. The term "exceptional situation" designates any situation deviating from normal motor vehicle 10 operation and requiring a specific steering maneuver. For example, a situation linked to a risk for the vehicle or other object, such as a collision with a stationary object. As disclosed, the driver assistance system 1 obtains data from at least one sensor 5-7, i.e., it receives measurement data of the sensor and/or data obtained by processing unprocessed measurement data. The one sensor 5-7 may be part of the driver assistance system 1, for example a sensor supplying information or data regarding vehicle surroundings including, image or other data relating to the distance and/or position of objects such as pedestrians, vehicles, lane markers, or other indicia. The driver assistance system includes an analysis or control unit 2 capable of processing the data received from the sensor 5-7 and determining the existence or nonexistence of an exceptional situation as set forth above. Such an analysis or control unit 2 can also be used by other systems of the vehicle, i.e., it need not be associated only with the driver assistance system 1.

Figure 2:
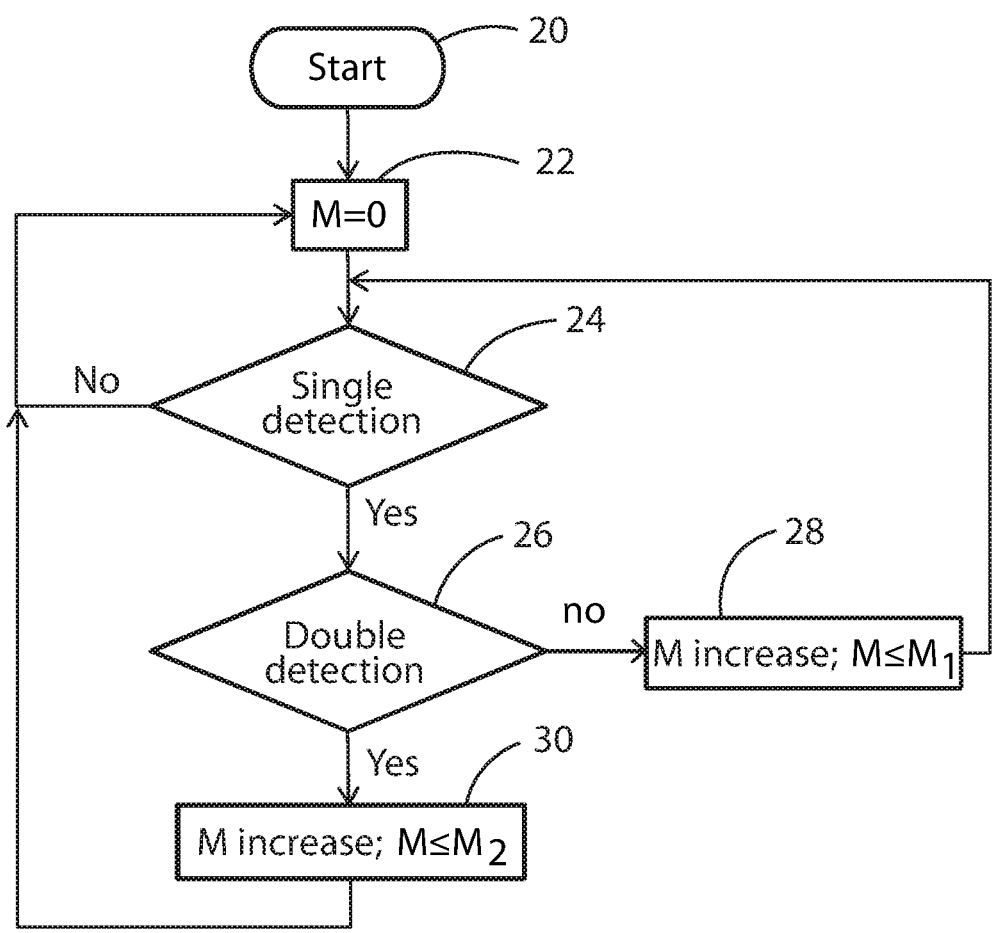
FIG. 2 is a flowchart of the functional sequence of the driver assistance system from FIG. 1.

FIG. 2 shows the essential sequence of the driver assistance system 1. Initially, the flowchart in FIG. 2 does not describe the steering torque produced by the power steering unit 4 in normal driving operation that assists the steering movements of the driver. Instead, as set forth below, the torques are corrective or applied torques based on the existence of an exceptional situation. At step one 20 the system starts. In the next step, block 22, the corrective steering torque M is set to zero, which corresponds to normal driving operation. In the next step, block 24, the driver assistance system 1 checks whether a single detection of an object exists. For example, does one of the sensors 5-7 detect an object. If no detection exists the system returns to block 22 in the corrective steering torque M remains at zero and a single detection is again checked for.

If a single detection exists in block 24, the system advances to block 26 and checks whether a double detection exists. For example, the same object is simultaneously acquired by a camera 5, 6 and the radar sensor 7 or by both cameras 5, 6. If no double detection exists, but rather only a single detection, this is assessed as recognition with lower reliability. Based on the learned position of the object, an evasion movement is computed, which requires a correction of the steering movement.

When a double detection does not exist, the driver assistance system 1 advances to block 28 and increases the steering torque M corresponding to the steering movement to be performed by the driver based on the single detection. The increase in steering torque M is, at most, up to a first maximum value M1, which can be, for example, 0.75 Nm. While not normally noticed by a driver, imposing additional steering torque prepares for a later increase of the steering torque M. The increase of the steering torque M can be done linearly, for example, where the rate of change can optionally also be limited (for example, to at most 8 Nm/s), to avoid the driver perceiving a jerk in the steering wheel 12.

If a double detection exists, the driver assistance system 1 advances to block 30 where the double detection is assessed as recognition of the object with higher reliability. In block 30, based on the higher reliability, the steering torque M is increased where limitation to the first maximum value M1 no longer exists, and the steering torque M increases to a higher second maximum value M2. The second maximum value M2 chosen so that the steering wheel 12 is not torn away from the driver, but the driver still has control over the steering of the motor vehicle 10. M2 can be, for example, 3.25 Nm.

A single detection typically precedes a double detection, for example, because one sensor 5-7 replies more slowly to the situation than another one. In such a case, the steering torque is first increased to the first maximum value M1 and subsequently, as soon as a double detection is determined, the steering torque is increased from the value M1 to the second value M2. The difference in proceeding from the steering torque M1 to steering torque M2 is less than proceeding from zero. Therefore, the full steering torque M can be reached rapidly, even if safety provisions or the inertia of the power steering unit 4 limits the rate of change.

FIG. 3 is a linear graph illustrating an applied steering torque Mapp 32 plotted in relation to steering torque M versus time t. Initially, a single detection, for example, by the radar sensor 7 occurs at the time t1. Based on the single detection, the steering torque Mapp 32 increases more or less linearly 34 in until reaching the first maximum value M1, at a point between t1 and t2, where the rate of change corresponding to the slope of the Maap 32 curve of FIG. 3 is subject to certain limits. The applied steering torque, see portion 36, remains at the first maximum value M1 until, at the time t2, the same object is detected by, for example one of the cameras 5, 6, whereby a higher reliability is provided. At time t2, the applied torque is no longer limited to the first maximum value M1, with the only applied torque limitation being the second maximum value M2.

The driver assistance system 1 then increases the steering torque M at a rate of change 38 typically higher than the rate of change provided in the case of single detection, for example, with at most 12 Nm/s. The desired value 40 for the corrective or applied steering torque, which is just below the second maximum value M2, can be reached rapidly because the increase started on the first or single detection. The rate of change 40 after t2, the second or double detection, can also be limited in the same manner as with the single detection.

As disclosed if the driver assistance system 1 recognizes an exceptional situation, it applies a corrective steering torque to the steering wheel of the vehicle. In the disclosed example, the steering torque is not exerted directly on the steering wheel, but is exerted, for example, on a steering train (steering rod and/or steering column) connected thereto or a pinion of an associated steering gear. A force can also be exerted on a toothed rack, with which the pinion interacts, to produce the steering torque. With indirect application to the steering wheel, transmission ratios and rigidities of the interposed components can optionally also be considered, so that a primary exerted torque can differ from the steering torque produced in the steering wheel.

The steering torque is applied or corrective insofar as it is produced independently of the steering movements of the driver. Such a steering torque, depending on its strength and on the force with which the driver holds the steering wheel, may cause an actual change of the steering wheel angle or in a force in the steering wheel that acts on the hands of the driver even if the driver does not perceive the force. The driver perceived steering torque is a specific strength whereby steering is made easier in one direction and more difficult in the opposite direction. Of course, the vehicle must have some type of power steering for this purpose enabling application of a steering torque to the steering wheel independently of the steering movements of the driver.

During all the recognition steps 24, 26 the driver assistance system 1 differentiates between a lower reliability and a higher reliability and sets the steering torque based on the reliability. The driver assistance system 1 does not simply differentiate between the existence and nonexistence of an exceptional situation, but rather it differentiates as to whether an exceptional situation is recognized with lower reliability or with higher reliability. If the driver recognition system 1 recognizes an exceptional situation, independent of the reliability, it applies a corrective steering torque to the steering wheel. However, the system 1 according to the present example sets the steering torque depending on the reliability, i.e., a different setting is performed at lower reliability than at higher reliability. Greatly varying criteria are conceivable for the degree of the reliability, of which several will be described.

In the present example, the system 1 treats exceptional situation recognition at a lower reliability as a precursor to recognition at a higher reliability. This precursor prepares for a further correction procedure, happening when the higher reliability is provided. This includes the possibility that the higher reliability will not be achieved. If so, the driver assistance system 1 initially increases the corrective or applied torque up to the value M1, block 28, and then checks again for a single detection in block 24. If there is no single detection in block 24, the system returns to block 22 and deactivates any corrective or applied steering torque.

Because the system reaches lower reliability first and subsequently a higher reliability a steering torque is applied to the steering wheel at low reliability and therefore the steering torque provided in the case of higher reliability can generally be reached more rapidly than if the higher reliability were waited for before producing any steering torque. In the present example, an exceptional situation normally not classified as sufficiently reliable will not remain unconsidered. Instead, such instances are used for preparation. Further, the "final" setting of the steering torque while not yet determined is determined upon providing the higher or sufficient reliability. The dynamic behavior of the assistance system 1 improves because a corrective or applied steering torque is set initially upon determination of a lower reliability.

The steering torque set at lower reliability preferably has the same direction as the steering torque set at higher reliability. Different methods and/or algorithms can be used for determining the steering torque at higher reliability, where the torque acts on a driving line of the vehicle considered ideal.

Where the corrective steering torque depends on the actual requirements compared to the steering behavior of the driver, for example on the relationship of an actual steering wheel angle to a target steering wheel angle, the corrective steering torque can be omitted under certain circumstances or in specific situations despite the existence of an exceptional situation, because no corrections are to be done. It is also conceivable that in specific situations, the required corrections are randomly just sufficiently large that the driver assistance system sets the steering torque at the higher reliability as it already was at lower reliability. However, the described situations are random individual cases, while the driver assistance system 1 according to the invention generally has a different setting at lower reliability than at higher reliability.

When setting the actual corrected or applied steering torque, when the higher reliability is provided, it is advantageous if the setting is more or less "braked" or limited at lower reliability. Setting the steering torque is preferably subject to at least one limitation at lower reliability in relation to the setting at higher reliability. Such a limitation can apply regarding the steering torque itself or regarding at least one of its time derivatives.

According to one example, a predefined maximum value of the steering torque is lower at lower reliability than at higher reliability. The maximum value designates the maximum absolute value of the torque; it is independent of the direction thereof. Independently of how large the required corrective steering torque would be at higher reliability, the steering torque is limited to a maximum absolute value, which is not exceeded at lower reliability. In this way, the driver does not or only insignificantly perceives the corrective or applied active steering torque if the reliability is low and an exceptional situation uncertain, not actually provided or has not happened. This can be achieved in particular because the maximum value M1 is at most 3 Nm, preferably at most 2 Nm, more preferably at most 1 Nm at lower reliability. Such torques are normally not perceived or are hardly perceived by the driver, but are an effective preparation for a corresponding higher torque, which can be set upon determining higher reliability. A maximum value M2 is also predefined at higher reliability, for example, to prevent the steering wheel from being torn away from the driver. But, it is also conceivable that no maximum value exists and/or this maximum value is infinitely large at higher reliability.

In a further example, the predefined maximum rate of change of the steering torque can be lower at lower reliability than at higher reliability. This designates the maximum absolute value of the rate of change, independently of the direction of the change. With lower reliability, the steering torque changes comparatively slowly or "softly." For example, the rate of change could be restricted to at most 10 Nm/s, 8 Nm/s, or 6 Nm/s. At higher reliability, in contrast, the maximum rate of change can be selected to be higher, since the existence of an exceptional situation is considered reliable and other driving considerations have priority over the driving feeling of the driver. A clear indication of a need to perform a steering movement can be given to the driver by a higher rate of change, for example a more rapid change of the steering torque. The driver may perceive the rapid change as a type of jerk in the steering wheel. At higher reliability, no maximum rate of change can also be specified and/or the maximum rate of change can be infinitely large.

An electromechanically driven power steering unit 4 of the vehicle 10 typically produces or generates the steering torque. For example, an electromechanically driven power steering unit (EPAS; electro power assisted steering) activatable by the driver assistance system 1. However, an electro-hydraulically driven power steering unit (EHPAS; electro-hydraulic power assisted steering) could also be used, for example, if is settable with the aid of a microcontroller, for example, through solenoid valves. The respective power steering unit can be considered part of the driver assistance system, although accessed by other systems.

Reliability can be coupled, for example, to specific thresholds of a measured value supplied by a sensor. It is conceivable, for example, that if a first, lower threshold is exceeded, a lower reliability is assumed, while a higher reliability is assumed if a second, higher threshold is exceeded. But the higher reliability is preferably determined based upon a plurality of conditions and the lower reliability is determined upon a part or portion of the plurality of conditions. Such a plurality of conditions could be, for example, that two measured values exceed the respective threshold values assigned thereto or, for example, the present measured value and its time derivative exceed specific predefined threshold values. In addition, for example, multiple algorithms are used to analyze camera image data, where a condition is assigned to each algorithm. In each condition, respective algorithm recognizes an exceptional situation. The plurality of conditions may include recognition of the exceptional situation by multiple algorithms. As the term "plurality" makes clear, more than two conditions can also be provided for a higher reliability. In the disclosed example a full number of conditions is not required for a lower reliability, but rather only a part thereof, i.e., for example, one condition instead of two conditions. The system fundamentally checks each of the plurality of conditions and concludes a higher reliability upon the existence of all conditions, while a lower reliability is concluded upon the existence of a part of the conditions.

As set forth above, driver assistance system 1 may be configured to query a plurality of sensors 5-7, where one condition is associated with each sensor. Each sensor is responsible for fulfilling at least one condition, in particular exactly one condition. Therefore, data received from each sensor has to correspond to the respective condition to fulfill the plurality of the conditions. To check the respective condition, comparatively complex further processing may be necessary. In the case of a camera, the image data may be analyzed using recognition software, to recognize an object in the travel direction of the vehicle. Since this condition may cause a potentially erroneous recognition of an object, it could be combined with a second condition, for example, the recognition of the same object by another sensor, which also recognizes objects with a specific error rate. If both sensors recognize the same object and both conditions are fulfilled, the object and/or the exceptional situation linked thereto is also recognized with high reliability. Possible situation-related disadvantages of a sensor due to its position or its functional principle, for example, could be compensated for by combination of the data.

Independently of whether one or more sensors are queried, at least one sensor is preferably designed as a camera 5, 6, radar sensor 7, or lidar sensor. In the case of a plurality of sensors, a condition is associated with each one, in particular two sensors having different functional principles. For example, a camera and a radar sensor can be combined with one another. A combination of similarly or identically functioning sensors, for example two cameras, is also expressly conceivable. The above-mentioned sensors are provided in many modern vehicles and therefore no retrofitting and/or special equipment with sensors is necessary. The data of the mentioned sensors can be combined with further items of information, which do not relate to the surroundings of the vehicle, for example, velocity and steering angle, from which the expected further movement of the vehicle may be derived, which is in turn determinative of whether, for example, a collision with a known object is a concern or not.

Greatly varying embodiments are conceivable here. For example, a weak reflection signal of a lidar sensor could be evaluated as recognition with lower reliability, while the additional recognition of an object by a camera combined with the weak reflection signal is classified as recognition with higher reliability. In addition, a strong reflection signal per se could be classified as recognition with high reliability.

The driver assistance system according to the disclosed examples reasonably recognizes varying exceptional situations. It recognizes a possible collision as an exceptional situation. This can be a collision with a moving object, for example, another vehicle, or a stationary object such as a sign, road marker post, a guardrail, or the similar object. In such imminent collisions, the time factor is particularly decisive, and initial application of corrective or applied torque when an exceptional situation is recognized with lower reliability can provide the driver with fractions of a second to evade the object. Alternatively, the driver assistance system can also be configured to recognize other exceptional situations, for example, possible unintentional leaving of a lane, understeering, or oversteering of the vehicle, etc.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A driver assistance system for a vehicle comprising:
   a power steering unit for applying steering torque;
   a plurality of sensors, each sensor obtaining data indicating whether an object is detected;
   a control unit receiving said data from said sensors and based on said data recognizing an exceptional situation when an object is detected;
   said control unit upon recognizing said exceptional situation differentiating between a lower reliability and a higher reliability of said exceptional situation based on a number of sensors detecting an object, wherein the higher reliability equates to a higher number of sensors detecting an object;
   applying a steering torque upon recognizing the exceptional situation and based on said differentiation between said lower and higher reliability varying the applied steering torque;
   wherein the higher reliability is provided upon existence of all of a plurality of conditions and the lower reliability is provided upon existence of a portion of the plurality of conditions; and
   each condition is associated with a corresponding sensor.

2. The driver assistance system of claim 1 wherein a predefined maximum value of the steering torque is lower at lower reliability than at higher reliability.

3. The driver assistance system of claim 1 wherein a maximum value of applied steering torque is 3 Nm at lower reliability.

4. The driver assistance system of claim 1 wherein a maximum value of applied steering torque is at most 1 Nm at lower reliability.

5. The driver assistance system of claim 1 wherein a predefined maximum rate of change of the steering torque is lower at lower reliability than at higher reliability.

6. The driver assistance system of claim 1 wherein said plurality of sensors includes at least one of a camera, a radar sensor, or a lidar sensor.

7. The driver assistance system of claim 1 wherein said exceptional situation includes a possible collision.

8. A driver assistance system for a motor vehicle configured to recognize an exceptional situation and set a corrective steering torque comprising:

the driver assistance system configured to differentiate between a lower reliability and a higher reliability of the exceptional situation upon recognizing the exceptional situation;

the driver assistance system sets the corrective steering torque at a first maximum value at the lower reliability and at a second maximum value at the higher reliability;

wherein the higher reliability is provided upon existence of a plurality of conditions and the lower reliability is provided upon existence of a part of the plurality of conditions; and wherein the driver assistance system is configured to query a plurality of sensors, wherein one of the conditions is associated with each sensor.

9. The driver assistance system of claim 8 wherein a first maximum value of the corrective steering torque at the lower reliability is lower than the second maximum value at the higher reliability.

10. The driver assistance system of claim 8 wherein the first maximum value of the corrective steering torque is at most 1 Nm at the lower reliability.

11. The driver assistance system of claim 8 wherein a predefined maximum rate of change of the corrective steering torque is lower at the lower reliability than at the higher reliability.

12. The driver assistance system of claim 8 wherein said plurality of sensors includes at least one of a camera, a radar sensor, or lidar sensor.

13. The driver assistance system of claim 8 wherein said driver assistance system is configured to recognize the exceptional situation as a possible collision.

14. A method for applying a steering torque in a vehicle steering system comprising the steps of:

initially setting the steering torque applied by a power steering unit at a value of zero;

receiving data from a first sensor and based on said data determining whether a single detection of an object exists;

when a single detection exists, assessing said single detection as a recognition with lower reliability and increasing the steering torque applied by the power steering unit to a first maximum value;

receiving data from a second sensor and based on said data determining whether a double detection of the object exists;

when a double detection exists, assessing said double detection as a recognition with higher reliability and increasing the steering torque applied by the power steering unit to a second maximum value;

increasing the steering torque from zero to the first maximum value at a predefined maximum rate of change;

increasing the steering torque from the first maximum value to the second maximum value at a predetermined maximum rate of change; and wherein the rate of change from zero to the first maximum value is less than the rate of change from the first maximum value to the second maximum value.

* * * * *